United States Patent [19]

Sugimura et al.

[11] Patent Number: 4,628,964

[45] Date of Patent: Dec. 16, 1986

[54] BACKGROUND DEVICE FOR SEPARATING MEMBER IN ACCUMULATOR CHAMBER

[76] Inventors: Nobuyuki Sugimura; Kazuo Sugimura, both of 308, Mabase, Shimizu-shi, Shizuoka-ken, Japan

[21] Appl. No.: 731,996

[22] Filed: May 8, 1985

[51] Int. Cl.4 .............................................. F16L 55/04
[52] U.S. Cl. ......................................... 138/30; 138/42
[58] Field of Search .............................. 138/26, 30, 42; 220/85 B

[56] References Cited

U.S. PATENT DOCUMENTS 2,290,337 7/1942 Knauth .................................. 138/30
2,845,951 8/1958 Hugley et al. ......................... 138/30
3,893,485 7/1975 Loukonen .............................. 138/30

FOREIGN PATENT DOCUMENTS 597550 5/1960 Canada ................................... 138/30

Primary Examiner—James E. Bryant, III
Attorney, Agent, or Firm—Wood, Dalton, Phillips, Mason & Rowe

[57] ABSTRACT

A protective device for employing in an accumulator wherein, in a pressure vessel, a separating member dividing the interior of the pressure vessel and a supporting cylinder having open pores as said protective device are coaxially arranged in order of approaching the axis. The protective device is for protecting the separating member from damage when the separating member is pressed against the supporting cylinder. By virtue of employing the novel protective device in an accumulator, the fluid flow through the supporting cylinder is not hindered and no fragments detached from the material of supporting cylinder enter the fluid to damage the fluid system.

8 Claims, 11 Drawing Figures

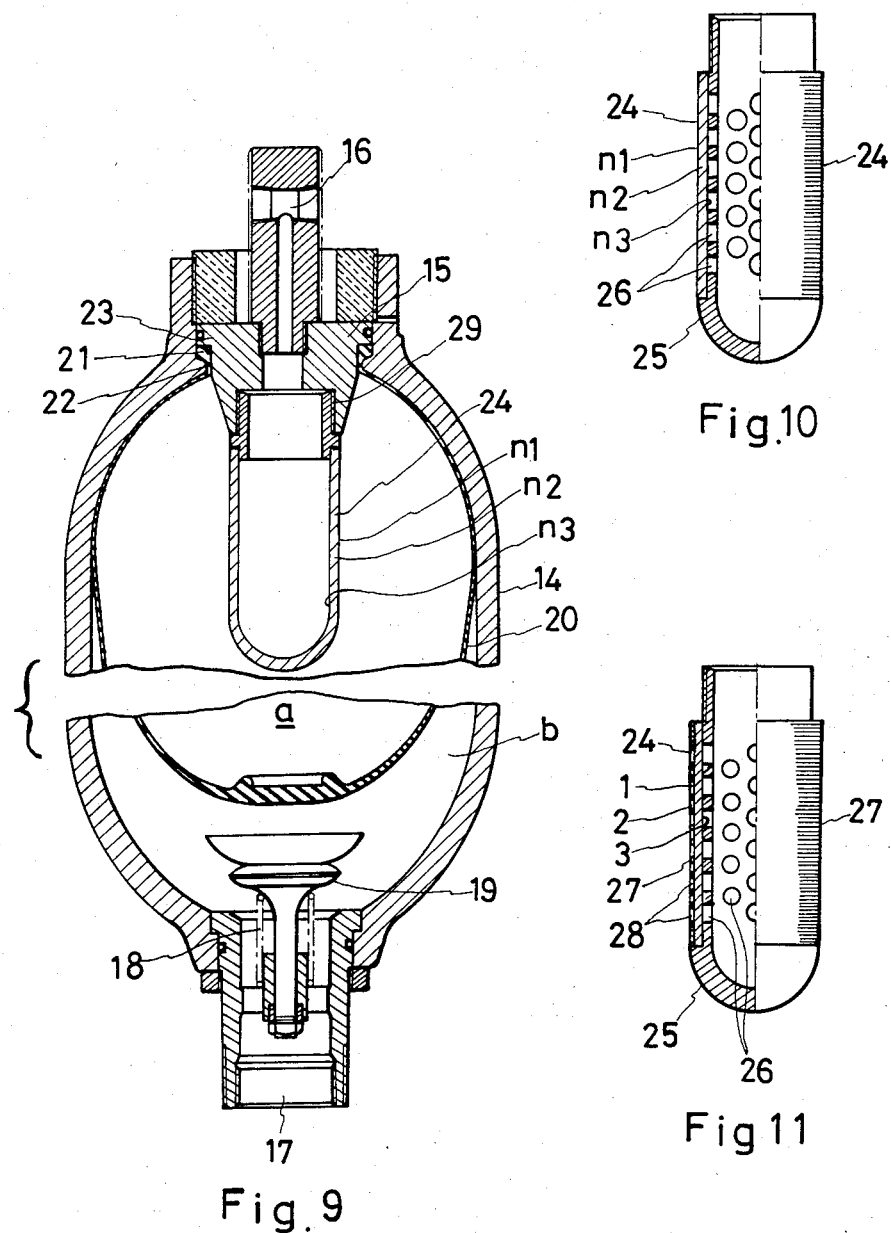

4,628,964

BACKGROUND DEVICE FOR SEPARATING MEMBER IN ACCUMULATOR CHAMBER

BACKGROUND OF THE INVENTION

The present invention relates to a protective member to be provided within a pressure vessel of an accumulator which is generally used in various hydraulic systems for storing or damping fluid pressure or for transporting fluid by pressure, the protective member being provided for preventing any damage of a separating member dividing the interior of a pressure vessel into two sections when the separating member is forced on the ragged surface of a supporting cylinder arranged on the shrinking side of separating member at the limit of shrinkage.

In the prior art, such a protective device is constituted by interposing valve plates between a separating member and each of the communicating holes formed in a supporting cylinder. By virtue of such a mechanism, the damage of separating member due to direct contact to communicating holes is prevented when the separating member shrinks.

However, it is impossible to form many communicating holes over the whole periphery of the supporting cylinder because of the structure. Thus, the flow of fluid through these communicating holes has a low efficiency. Moreover, the fabrication cost for providing with valve plates is high.

In some prior art accumulators, the supporting cylinder comprises porous material which is composed by sintering metal powder. In this construction, when the shrunk separating member contacts directly with the supporting cylinder, the metal powder gives a protective effect from damage of separating member. Although the effect of metal powder as protective member increases as a finer metal powder is employed, the resistance to fluid flow increases so that the further finer powder cannot be used.

In consideration of these results, some attempts are made to obtain an appropriate resistance to fluid flow by selecting the particle size of metal powder. However, the mutual binding of particles is various. For example, three particles may adhere one another to form a triangle. In this case, the formed void is minute. If five particles sinters to form a ring as a result of bridging, the formed void is coarse. Consequently, sizes of open pores for fluid which comprise these voids scatter largely. The corresponding parts of separating member are forced into coarser open pores and a damage of the member can arise.

Besides, any metal particles constituting sintered body may detach from the material and enter the liquid. These particles can destroy the whole hydraulic system. These are the fatal drawbacks of the equipment of this kind.

SUMMARY OF THE INVENTION

It is one object of the present invention to provide a supporting cylinder in which the aforementioned resistance to fluid flow is uniform throughout the periphery of the supporting cylinder.

Another object of this invention is to provide a supporting cylinder having fine open pores of uniform size, which can inhibit any damage of separating member due to impression even when the separating member is forcibly pressed against open pores thereof.

It is a further object of the present invention to provide a supporting cylinder having a low total resistance to fluid flow, in which open pores are formed to be of manifold and the fluid passes in and out through the whole periphery thereof.

It is an additional object of the present invention to provide a supporting cylinder wherein no particles detached from sintered metal of supporting cylinder are mixed with the fluid and flow into the hydraulic equipment to break down it.

The foregoing objects and other objects are achieved by the present invention which comprises a protective device for a separating member in an accumulator wherein a separating member and a supporting cylinder as said protective device are coaxially arranged in order of approaching the axis in a pressure vessel, said separating member being for dividing the interior of said pressure vessel, said protective device comprising a supporting cylinder composed of plural stainless steel or other metal wire nets superimposed one another so that the positions of mesh of one wire net are displaced from those of mesh of adjacent wire nets.

BRIEF DESCRIPTION OF DRAWINGS

The advavtages of the present invention will become apparent from the following detailed description of preferred embodiments thereof in connection with the accompanying drawings in which like numerals designate like elements and in which:

FIG. 9 is a longitudinal section of an accumulator for transporting fluid by pressure, which is provided with a protective device according to this invention, FIG. 10 is a partly sectional side view of a portion of the accumulator shown in FIG. 9, in which a device of FIG. 3 is arranged, and FIG. 11 is a partly sectional side view of a portion of the accumulator shown in FIG. 9, in which a device of FIG. 4 is arranged.

DETAILED DESCRIPTION OF PREFERRED EMBODIMENTS

Figure 1:
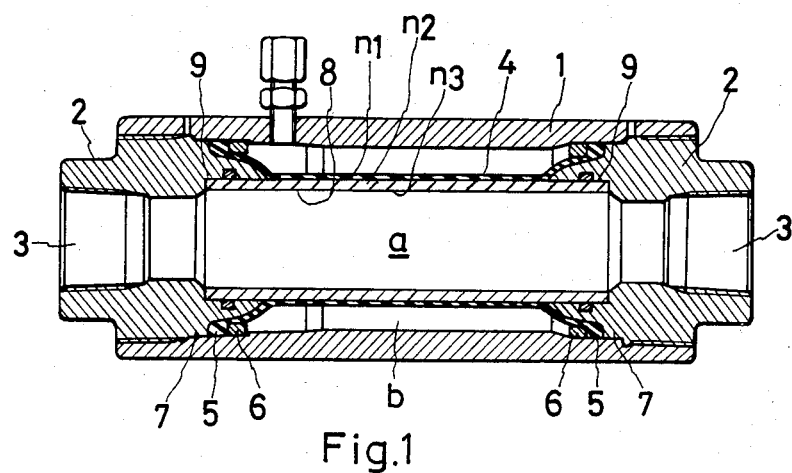
FIG. 1 is a longitudinal cross-sectional view of an accumulator for absorbing pressure pulsation wherein a protective device, as an embodiment of this invention, is arranged.
Figure 2:
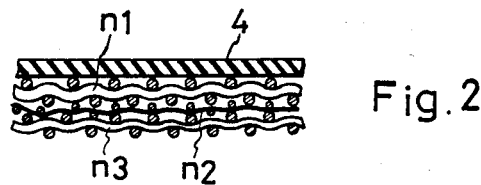
FIG. 2 shows a part of FIG. 1 in enlarged scale.

Now, the protective device for separating member according to this invention will be explained in detail in the case of employing the device in an accumulator for absorbing pressure pulsation as shown in FIG. 1.

A common accumulator for absorbing pressure pulsation comprises a cylindrical pressure vessel and two plugs 2 which close both ends of cylindrical pressure vessel. Two coupling holes 3 formed in said plugs 2 are connected to pipes (not shown) so that the accumulator can be arranged in a piping system for feeding pressurized liquid.

The aforementioned pressure vessel 1 is divided into two separate compartments a and b by means of a separating member 4 which is made of an elastic material, such as freely expandable and contractile rubber, and is shaped to a hollow cylinder. Flanges 5 provided at both ends of the separating member are clamped between receiving rings 6 formed on the inner surface of pressure vessel 1 and press flanges 7 of plugs 2 so that the separating member is hermetically mounted on the pressure vessel 1. Within the compartment a into which the separating member 4 contracts, there is provided a supporting cylinder 8 for separating member 4. This supporting cylinder is composed of plural wire nets $n_1$, $n_2$ and $n_3$ having different meshes. The wire spacings are so close that the separating member 4 cannot be pressed into meshes. These wire nets are superimposed one another with displacing the positions of the mesh of a wire net from those of the mesh of adjacent wire nets, and are rolled to form an open cylinder. Or, the superimposed wire nets are sintered to integrate, and are rolled to form a cylinder. Both ends of the formed cylinder are fitted in receiving recess 9 shaped in the abovementioned plugs 2. Thus, the supporting cylinder is arranged between both plugs 2.

Figure 3:
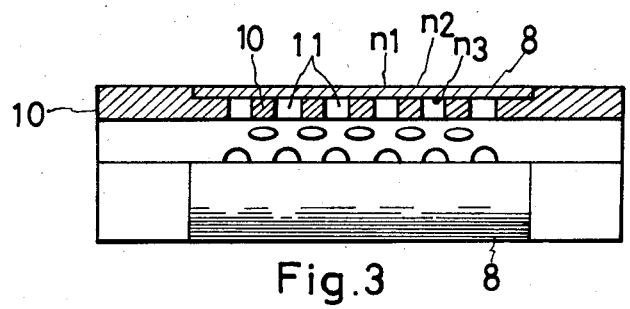
FIG. 3 is a side view, partially cut away, of a portion of another embodiment of this invention, split axially thereof, in which impertinent parts shown in FIG. 1 are omitted.
Figure 4:
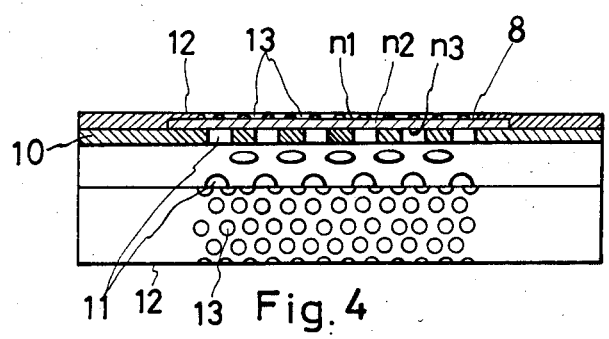
FIG. 4 is a side view, partially cut away, of a portion of still another embodiment of this invention, split axially thereof, which corresponds to FIG. 3.
Figure 5:
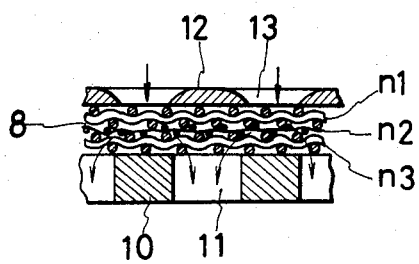
FIG. 5 shows a portion of FIG. 4 in enlarged scale.

FIGS. 3, 4 and 5 of the accompanying drawings illustrate respective other embodiments of the supporting cylinder in accordance with this invention. In the embodiment of FIG. 3, a reinforcing cylinder 10 made of metal is arranged only on the inner side of supporting cylinder 8, i.e. on the side opposite to the side to contact with the separating member 4. The reinforcing cylinder 10 is for supporting the supporting cylinder 8 and is provided with many equidistant communicating holes 11 having a relatively large diameter.

In the embodiment shown in FIG. 4, the supporting cylinder 8 is provided with not only a reinforcing cylinder 10 having communicating holes 11 on the side opposite to the side toward the separating member, but also a reinforcing cylinder 12 on the outer side, i.e. on the side toward the separating member 4. The latter reinforcing cylinder 12 is made to have communicating holes 13, the size and the spacing of communication holes 13 being different from those of communicating holes 11.

Figure 6:
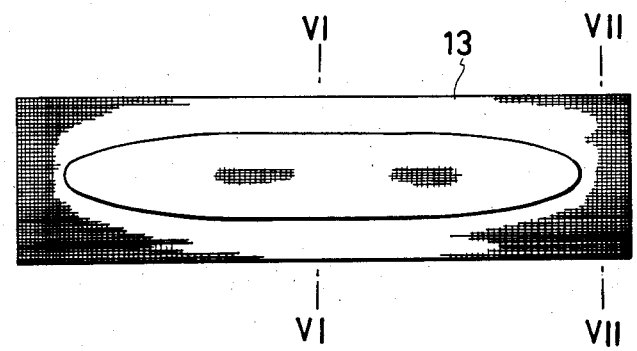
FIG. 6 is a side view of yet another embodiment of this invention, which corresponds to FIG. 3.
Figure 7:
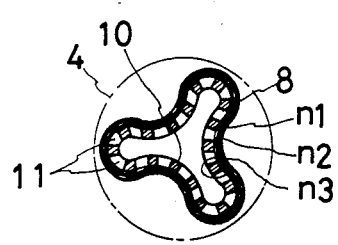
FIG. 7 represents a cross section taken along line VI—VI of FIG. 6.
Figure 8:
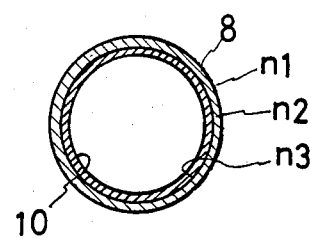
FIG. 8 represents a cross section taken along line VII—VII of FIG. 6.

FIG. 5 illustrates, in enlarged scale, a portion of the supporting cylinder 8 consisting of plural wire nets $n_1$, $n_2$ and $n_3$ with reinforcing cylinders 10 and 12 provided on both sides thereof, which is shown in FIG. 4. In order to prevent the broad fluctuation of the size of formed open pore as in the material produced by sintering metal powder, each of wire nets $n_1$, $n_2$ and $n_3$ has the meshes different in size from those of other nets, or they are superimposed with displacing the positions of the mesh of a wire net from those of the mesh of adjacent nets so that branched open pores with high tortuosity may be formed through the layer of wire nets. In the example shown in FIG. 5, the space between adjacent wires in metal net 2 is narrower than those of nets 1 and 3. FIGS. 6 to 8 illustrate a supporting cylinder 8 having a varied shape of section, as compared to those of above-mentioned supporting cylinders. While both end parts of the supporting cylinder to be fitted in receiving recesses 9 of plugs 2 (in FIG. 1) is made to be cylindrical, as shown by FIG. 8, the middle part thereof is shaped to have a cross section of delta form, as shown by FIG. 7, or of star form (not shown). Thus, the supporting cylinder is constructed so that the separating member 4 which has expanded to a circular periphery as shown by a chain-dotted line in FIG. 7 can readily contract with keeping an almost entire length of the circumference of a circle due to the supporting cylinder having a delta form section.

An accumulator provided with one of the above-stated protective device as embodiment of this invention is installed midway in a pipe line for transporting pressurized liquid. A pressurized gas is introduced in the compartment b outside the separating member 4 and the compartment is sealed. When a pulsating pressurized liquid is made to flow through the inner copartment a by means of a pressure pump, the liquid pressure acts through the supporting cylinder on the separating member 4 to perform expanding and contracting motions responding to pressure pulsation. As a result, the pulsation component of pressure attenuates. As the supporting cylinder 8 for separating member 4 is composed of plural wire nets $n_1$, $n_2$ and n which have been superimposed one another with their meshes not in register by varying the size of mesh or by displacing the position of mesh for each net, nearly uniform open pores having a less resistance to fluid flow are formed throughout the periphery of supporting cylinder. Consequently, the pressurized liquid acts effectively on the entire separating member 4 and the attenuation of pulsation efficiently results. When the pressure of liquid decreases and the separating member 4 is pressed against the supporting cylinder 8 by the pressure of gas in the compartment b, the separating member is safely supported without being pressed into open pores of the supporting cylinder, since said cylinder is composed of plural wire nets $n_1$, $n_2$ and $n_3$ superimposed one another with their meshes not in register and the formed open pores are sufficiently minute in size.

In addition, open pores of the supporting cylinder 8 composed of plural wire nets $n_1$, $n_2$ and $n_3$ superimposed one another with their meshes not in register make a large number of pathways with high tortuosity through the layer, as can be seen from FIG. 5. Accordingly, even though the supporting cylinder 8 is interposed between the reinforcing cylinders 10 and 12 and the positions of communicating hole 11 of reinforcing cylinder 10 are shifted from the positions of communicating hole 13 of reinforcing cylinder 12, the liquid can flow smoothly and surely from communicating holes 11 to communicating holes 13 and vice versa.

Now, reffering to FIG. 9 of the accompanying drawings, there is shown a transfer barrier. As an accumulator for transporting liquid by pressure, which comprises a pressure vessel 14 of sausage shape, a plug member 15 which closes the upper end of pressure vessel and is provided with a port 16 for feed fluid, and a port 17 for operating liquid in the lower end part of pressure vessel, which is provided with a poppet valve 19 having a spring 18 for opening valve.

A separating member 20 dividing the interior of the pressure vessel into two separate compartment a and b, is made of an elastic material, such as freely expandable and contractile rubber. The separating member is shaped to the form of a bladder fit for the pressure vessel 14. The separating member 20 is mounted hermetically on the pressure vessel 14 by clamping a flange 21 formed around the opening of the bladder 20 with a receiving thick fin 22 provided on the inner surface of pressure vessel 14 and a press flange 23 of plug member 15.

To support the separating member 20, there is provided a supporting cylinder 24 in the compartment a into which the separating member 20 contracts. This supporting cylinder is composed of plural wire nets $n_1, n_2$ and $n_3$. The wire spacings thereof are so close that the separating member 20 cannot be pressed into their meshes. Wire nets having different meshes are superimposed one another, or wire nets having the same mesh are superimposed one another with displacing the positions of the mesh of a wire net from those of the mesh of adjacent wire nets. Thus-formed layer of wire nets is rolled to form a thimble having desired diameter. Or, the layer of wire nets is sintered by heating to integrate and is rolled to form a thimble. The formed thimble is suspended within the compartment a by fitting the edge of its opening in receiving recess 29 provided in the above-mentioned plug member 15.

FIGS. 10 and 11 illustrate other examples of supporting cylinder 24. In the embodiment of FIG. 10, a reinforcing cylinder 25 made of metal is arranged on the inner side of supporting cylinder 24, i.e. on the side opposite to the side to contact with the separating member 20. The reinforcing cylinder 25 is for bearing the supporting cylinder 24 and is provided with many equidistant communicating holes 26 having a relatively large diameter.

In the embodiment shown in FIG. 11, the supporting cylinder 24 is provided with not only a reinforcing cylinder 25 on the side opposite to the side toward the separating member 20, but also a reinforcing cylinder 27 on the side toward the separating member 20. The latter reinforcing cylinder 27 is made to have communicating holes 28, the size and the spacing of communicating holes 28 being different from those of communicating holes 26.

To use an accumulator provided with one of these embodiments in accordance with this invention, one of compartments separated by separating member 20 in the pressure vessel 14, i.e. compartment a into which the separating member 20 contracts, is permitted to communicate with the port 16 for feed fluid. The other compartment b is permitted to communicate with the port 17 for operating liquid.

When an operating liquid is not fed to the compartment b, a feed fluid flows into the compartment a via the port 16 because the separating member 20 expands to enlarge the compartment to the maximum volume. In this state, when the operating liquid is forced to flow into the compartment b from the port 17 for operating liquid and applies pressure on the separating member 20, the separating member 20 contracts and delivers the feed fluid contained therein from the port 16. The repetition of these procedures works as if a single piston pump would work. The feed fluid, in this case, smoothly flows in or out through the supporting cylinder 24 with less pressure loss, as the supporting cylinder 24 for the above-stated separating member is composed of plural wire nets $n_1$, $n_2$ and $n_3$ superimposed one another with their meshes not in register and, thus, approximately uniform open pores having less resistance to flow are formed throughout the entire periphery of the cylinder. Moreover, when the separating member 20 is pressed against the periphery of supporting cylinder 24 due to a pressure drop of feed fluid, minute open pores of supporting cylinder 24 which are constituted by superimposing wire nets $n_1$, $n_2$ and $n_3$ one another with their meshes not in register sustain safely the separating member 20, as the structure of such open pores is so strong and so fine that the material of pressed separating member 20 cannot enter the pores.

In addition, open pores of the supporting cylinder 24 composed of plural wire nets $n_1$, $n_2$ and $n_3$ superimposed one another with their meshes not in register make a large number of branched paths with high tortuosity in the direction of arrows in FIG. 5. Accordingly, even though the supporting cylinder 24 is interposed between the reinforcing cylinder 25 and 27 and the positions of communicating hole 26 of reinforcing cylinder 25 are shifted from the positions of communicating hole 28 of reinforcing cylinder 27 as shown by FIG. 11, the fluid can flow smoothly and surely from communicating holes 26 to communicating holes 27 and vice versa.

As mentioned above, the device according to this invention comprises a supporting cylinder for a separating member which divides the interior of a container into two separate compartments. As said supporting cylinder is constructed by superimposing plural wire nets one another so that the positions of mesh of one wire net are displaced from those of mesh of adjacent wire nets. Consequently, the resulting supporting cylinder has a large number of nearly uniform open pores having low resistance to fluid flow over the entire peripheral surface thereof. When this device is employed in an accumulator for absorbing pulsation, the resulting accumulator shows a higher performance than those of other accumulators for the same purpose.

When this device is employed in an accumulator for transfer barrier, the resulting apparatus has a high operating efficiency as transfer barrier. In addition, as the wire nets constituting the supporting cylinder are superimposed one another so as to have their meshes not in register, the formed open pores are fine ones of nearly equal sizes. The material of a separating member cannot be pressed into such a fine pore even under the pressure of operating fluid. Thus, the objective protection for separating member is achieved. Moreover, the above-stated open pores constitute many branches having high tortuosity through the layer. Accordingly, even if the supporting cylinder has been provided with a reinforcing cylinder on one side or reinforcing cylinders on both sides, the fluid flows readily from one side to the other side to advantage. Furthermore, the supporting cylinder composed of wire nets has not the drawback that any detached metal particles from sintered body enter the liquid in the case of prior supporting cylinder made of sintered metal, nor the drawback that the supporting cylinder comprising valve plates damages the separating member.

What we claim is:

1. An accumulator comprising a pressure vessel having a separating member therein and a protective device for preventing damage to the separating member, wherein the vessel has an axis and the separating member is generally arranged coaxially within the vessel so as to expand outwardly to rest against the vessel and collapse inwardly against the protective device, said device comprising a supporting cylinder composed of plural wire nets superimposed upon one another so that the positions of mesh of one wire net are displaced from those of mesh of adjacent wire nets.

2. An accumulator, as set forth in claim 1, in which said accumulator comprises an accumulator for absorbing pulsation wherein a cylindrical pressure vessel, a cylindrical separating member, and a supporting cylinder, as said protective device, having a cross section of circular form are coaxially arranged generally about a common axis.

3. An accumulator, as set forth in claim 1, in which said accumulator comprising an accumulator for absorbing pulsation wherein a cylindrical pressure vessel, a cylindrical separating member, and a supporting cylinder, as said protective device, has a cross section of delta form generally coaxially arranged with the accumulator axis.

4. An accumulator, as set forth in claim 1, in which said accumulator is a pressure vessel of sausage form, and the separating member is of the same form as the vessel, said protective device including a supporting cylinder having the shape of a thimble, said vessel, separating member and cylinder being arranged generally about a common axis.

5. An accumulator, as set forth in claim 1, wherein each of said plural wire nets has the mesh of same size with those of the adjacent wire nets and said plural wire nets are superimposed one another so that the positions of mesh of one wire net are displaced from those of the mesh of adjacent wire nets.

6. An accumulator, as set forth in claim 1, wherein each of said plural wire nets has the mesh of different size from those of the other wire nets and said plural wire nets are superimposed one another so that the positions of mesh of one wire net are displaced from those of mesh of adjacent wire nets.

7. An accumulator, as set forth in claim 1, wherein said plural wire nets superimposed upon one another are arranged on the outer perpheral surface of a reinforcing cylinder provided with a plural number of communicating holes.

8. An accumulator, as set forth in claim 1, wherein said plural wire nets superimposed upon one another are interposed between outer and inner reinforcing cylinders provided with a plural number of communicating holes.

* * * * *